US010901663B2

(12) United States Patent
Hori (10) Patent No.: US 10,901,663 B2
(45) Date of Patent: Jan. 26, 2021

(54) INFORMATION PROCESSING APPARATUS, CONTROL METHOD THEREOF, AND NON-TRANSITORY COMPUTER-READABLE STORAGE MEDIUM

(71) Applicant: CANON KABUSHIKI KAISHA, Tokyo (JP)

(72) Inventor: Daisuke Hori, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/411,298

(22) Filed: May 14, 2019

(65) Prior Publication Data

US 2019/0361639 A1  Nov. 28, 2019

(30) Foreign Application Priority Data

May 24, 2018  (JP) ................................. 2018-099792

(51) Int. Cl.
*G06F 3/12*  (2006.01)
*H04N 1/00*  (2006.01)

(52) U.S. Cl.
CPC .......... *G06F 3/1208* (2013.01); *G06F 3/1205* (2013.01); *G06F 3/1225* (2013.01); *H04N 1/00456* (2013.01); *H04N 1/00708* (2013.01); *H04N 1/00748* (2013.01)

(58) Field of Classification Search
CPC .... G06F 3/1208; G06F 3/1225; G06F 3/1205; H04N 1/00748; H04N 1/00456; H04N 1/00708
See application file for complete search history.

(56) References Cited

U.S. PATENT DOCUMENTS

| 7,212,309 | B1* | 5/2007 | Sellers | G06F 3/1208 345/668 |
|---|---|---|---|---|
| 9,019,553 | B2* | 4/2015 | Kurata | G06F 3/1208 358/1.2 |
| 9,349,079 | B2 | 5/2016 | Hori | |
| 2005/0168778 | A1* | 8/2005 | Abe | G06F 17/211 358/1.18 |
| 2012/0204101 | A1* | 8/2012 | Yoshida | G06F 3/0484 715/246 |
| 2017/0131655 | A1* | 5/2017 | Araki | G03G 15/043 |
| 2019/0212955 | A1* | 7/2019 | Gutierrez | G06F 3/1208 |

FOREIGN PATENT DOCUMENTS

JP   5253060 B2   7/2013

\* cited by examiner

*Primary Examiner* — Helen Zong
(74) *Attorney, Agent, or Firm* — Venable LLP (57) ABSTRACT

There is provided an apparatus that executes a first control program plugged in to an application to cause a printer to print data generated in the application and a second control program to be executed when a printing instruction is made, wherein the apparatus comprises a setting unit which sets, using the first control program, a predetermined sheet size which can include the data in one page to the application, and executes margin deletion setting to the second control program to cause margin deletion, a margin deletion unit which generates print data based on the data generated by the application and included in the one page having the predetermined sheet size, and deletes a margin in the generated print data, and an output unit which outputs, to the printer, the print data in which the margin has been deleted.

23 Claims, 11 Drawing Sheets

INFORMATION PROCESSING APPARATUS, CONTROL METHOD THEREOF, AND NON-TRANSITORY COMPUTER-READABLE STORAGE MEDIUM

BACKGROUND OF THE INVENTION

Field of the Invention

The present invention relates to a technique for printing a document generated by an application.

Description of the Related Art

A spreadsheet application such as Microsoft Excel® does not include sheet size as a concept. Hence, when a spreadsheet document is to be printed from such a spreadsheet application, a user needs to designate a specific sheet size to perform printing. However, since the aspect ratios of most spreadsheet documents differ from the ratios of standard sheet sizes such as A4 size and the like, a page can be divided at an unintended location or an unintended margin can be generated frequently in the page.

Therefore, in a printing system disclosed in Japanese Patent No. 5253060, predetermined sheet sizes are set to spreadsheet software, and the page count assigned to a spreadsheet document is obtained. Next, a sheet size that can include the spreadsheet document in one page and corresponds to the size of the spreadsheet document is calculated based on the obtained number of pages and the predetermined sheet sizes. In addition, a sheet size that fits the spreadsheet software better is obtained by setting the calculated sheet size to the spreadsheet software repeatedly while gradually reducing the calculated sheet size. Subsequently, the obtained sheet size is designated in the spreadsheet software, the data generated by the spreadsheet software in accordance with the sheet size is scaled by a printer driver in accordance with the size of a rolled sheet, and the scaled data is printed onto the rolled sheet by a printing apparatus. Printing without generating a wasteful division or margin is implemented in this manner.

However, the printing system of the above-described literature performs processing to set a better-fitting sheet size for a spreadsheet document to the spreadsheet software. Hence, the sheet size is adjusted by repeatedly performing the setting operation on the spreadsheet software while reducing the sheet size. Particularly, in a case in which the operation to set the sheet size to the spreadsheet software is performed many times for adjustment, a large amount of time can be taken to make the settings on an application. On the other hand, in a case in which a sheet size with many margins with respect to a spreadsheet document is set in the application, the data included in the one page-sheet having the set sheet size will be printed in a state with many margins.

SUMMARY OF THE INVENTION

According to an aspect of the present invention, there is provided an information processing apparatus that executes a first control program which is plugged in to an application that generates data as a print target and a second control program which is to be executed when a printing instruction is made via the first control program, comprising: a setting unit configured to set, by using the first control program, a predetermined sheet size which can include the data in one page to the application, and execute margin deletion setting to the second control program to cause margin deletion; and a margin deletion unit configured to generate print data based on the data generated by the application and included in the one page having the predetermined sheet size, and to delete a margin in the generated print data by using the second control program; and an output unit configured to output, to a printing apparatus, the print data in which the margin has been deleted by the margin deletion unit.

According to the present invention, even in a case in which a simpler setting is performed on an application, a wasteful margin portion can be deleted or reduced appropriately, and the data generated by the application can be printed on one print sheet.

Further features of the present invention will become apparent from the following description of exemplary embodiments (with reference to the attached drawings).

BRIEF DESCRIPTION OF THE DRAWINGS

FIG. 5 is a flowchart showing a processing procedure performed after the activation of the plug-in;

FIG. 6 is a flowchart of sheet size calculation processing performed by the plug-in;

DESCRIPTION OF THE EMBODIMENTS

Embodiments of the present invention will be described in detail hereinafter with reference to the accompanying drawings. Note that in the following embodiments, an example using plug-in software (to be referred to as a plug-in hereinafter) of spreadsheet software and a printer driver for processing print data printed from the spreadsheet software will be described. In this case, a plug-in is a program that adds a function to application software. For example, Microsoft Office® and Microsoft Internet Explorer® have made publicly available means for extending their respective functions. Hence, in these pieces of software, a plug-in can be registered to add a new function. Note that the following embodiments do not limit the scope of the appended claims, and not all combinations of features described in the embodiments are essential to the solving means of the present invention.

First Embodiment

Figure 1:
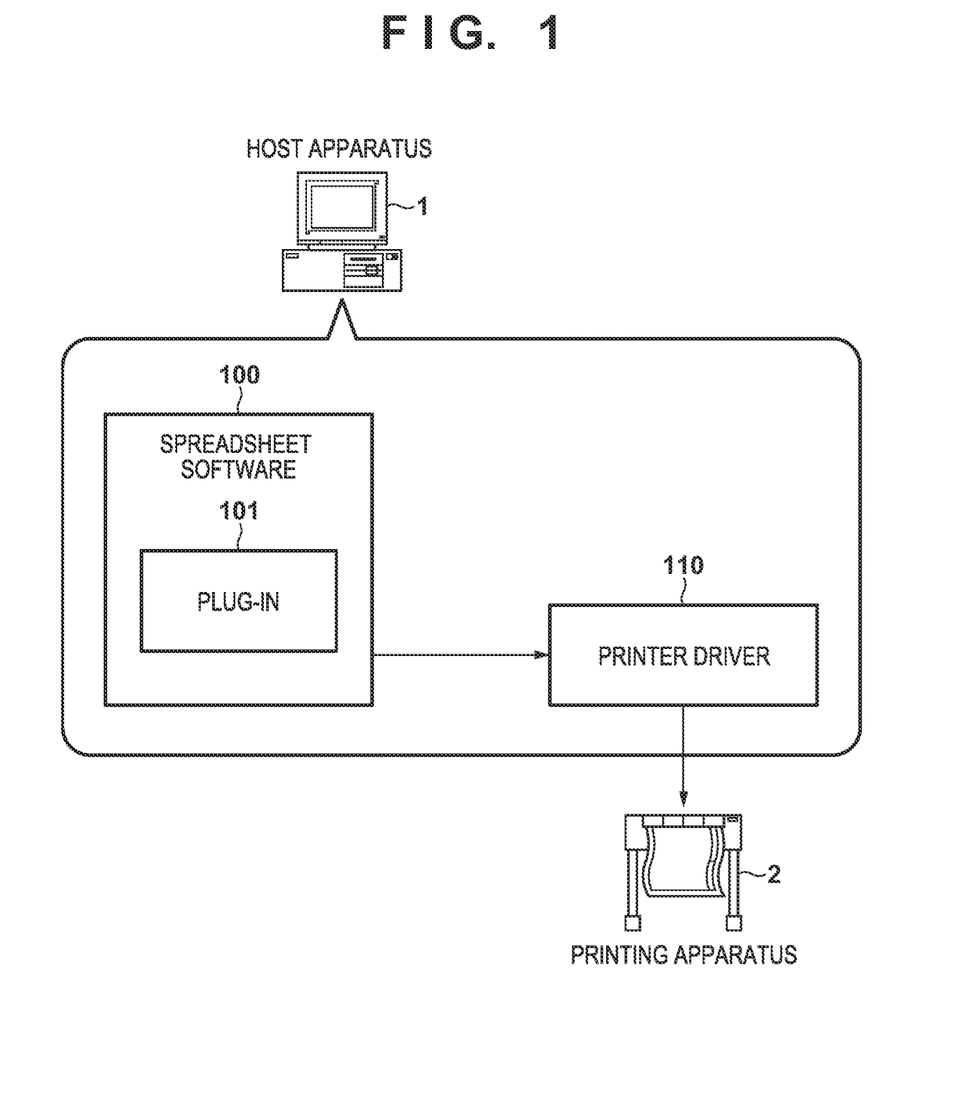
FIG. 1 is a view of the arrangement of a system according to the first embodiment.

FIG. 1 is a view of the arrangement of a system according to the first embodiment. This system is formed by a host apparatus 1 and a printing apparatus 2 on which a rolled sheet can be mounted. Assume that the host apparatus 1 is a personal computer or the like and that an OS (operating system) by Microsoft, a printer driver 110 which is software for controlling the printing apparatus 2, and general spreadsheet software 100 have already been installed in a storage device such as a hard disk or the like. In the description of this embodiment, assume that Microsoft Excel® will be used as the general spreadsheet software. Note that although it is assumed that the host apparatus 1 and the printing apparatus 2 are connected to each other via a network, they may be connected by another I/F and are not particularly limited to any type of wired or wireless connection.

A plug-in 101 is a kind of software for extending the function of the spreadsheet software 100, and operates on the spreadsheet software 100 to control the spreadsheet software 100. The printer driver 110 performs processing to receive print data from the spreadsheet software 100, generate print data in a format that can be interpreted by the printing apparatus 2, and transfer the print data to the printing apparatus 2.

Figure 2:
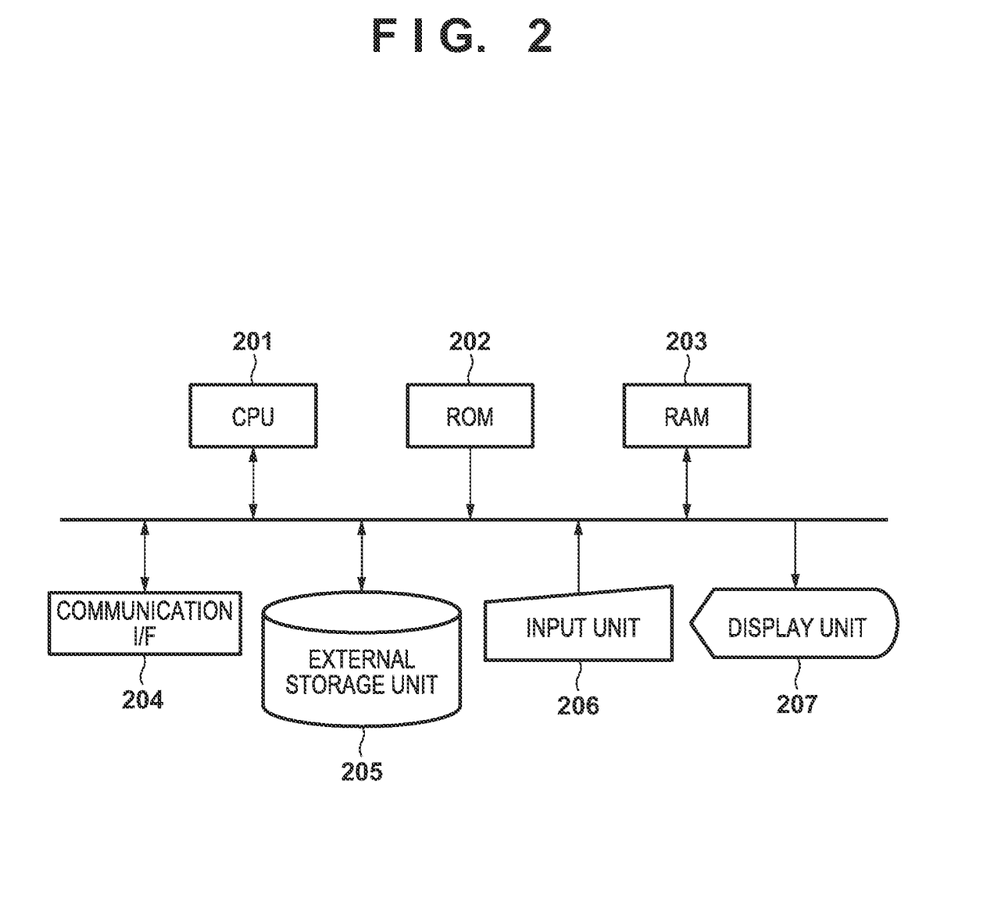
FIG. 2 is a block diagram showing the arrangement of a host apparatus.

FIG. 2 is a block diagram of the host apparatus 1. The host apparatus 1 includes a CPU 201, a ROM 202, a RAM 203, a communication interface 204, an external storage device 205, an input unit 206, and a display unit 207.

The CPU 201 performs various kinds of control on the overall host apparatus 1. An initialization program (BIOS, a boot program, or the like) executed by the CPU 201 at the activation of the host apparatus 1 and various kinds of data are stored in the ROM 202. The RAM 203 is used as the main memory of the CPU 201 and a work area. The external storage device 205 is formed from, for example, a hard disk (HDD) or the like and stores the OS, the spreadsheet software 100, the plug-in 101, the printer driver 110, other various kinds of programs, and data files generated by the spreadsheet software 100.

When this apparatus is powered on, the CPU 201 loads the OS from the external storage device 205 to the RAM 203 and executes the OS in accordance with the boot program in the ROM 202. As a result, the host apparatus 1 will function as an information processing apparatus that includes a user interface for inputting instructions from a user via the input unit 206 and displaying various kinds of information on the display unit 207. Furthermore, when the CPU 201 loads the spreadsheet software 100, the plug-in 101, and the printer driver 110 from the external storage device 205 to the RAM 203 and executes these software programs, this apparatus will function as a print control apparatus for a table generated by the user by using the spreadsheet software. Note that the input unit 206 is formed from a keyboard, a mouse, and the like, and the user can input various kinds of instructions to the CPU 201 via the input unit 206. The display unit 207 is formed from an LCD, a CRT, or the like and performs various kinds of display under the control of the CPU 201. In addition, this apparatus communicates with a peripheral apparatus such as the printing apparatus 2 via the communication interface 204. The print data generated by the printer driver 110 is transmitted to the printing apparatus 2 via the communication interface 204.

Figure 3:
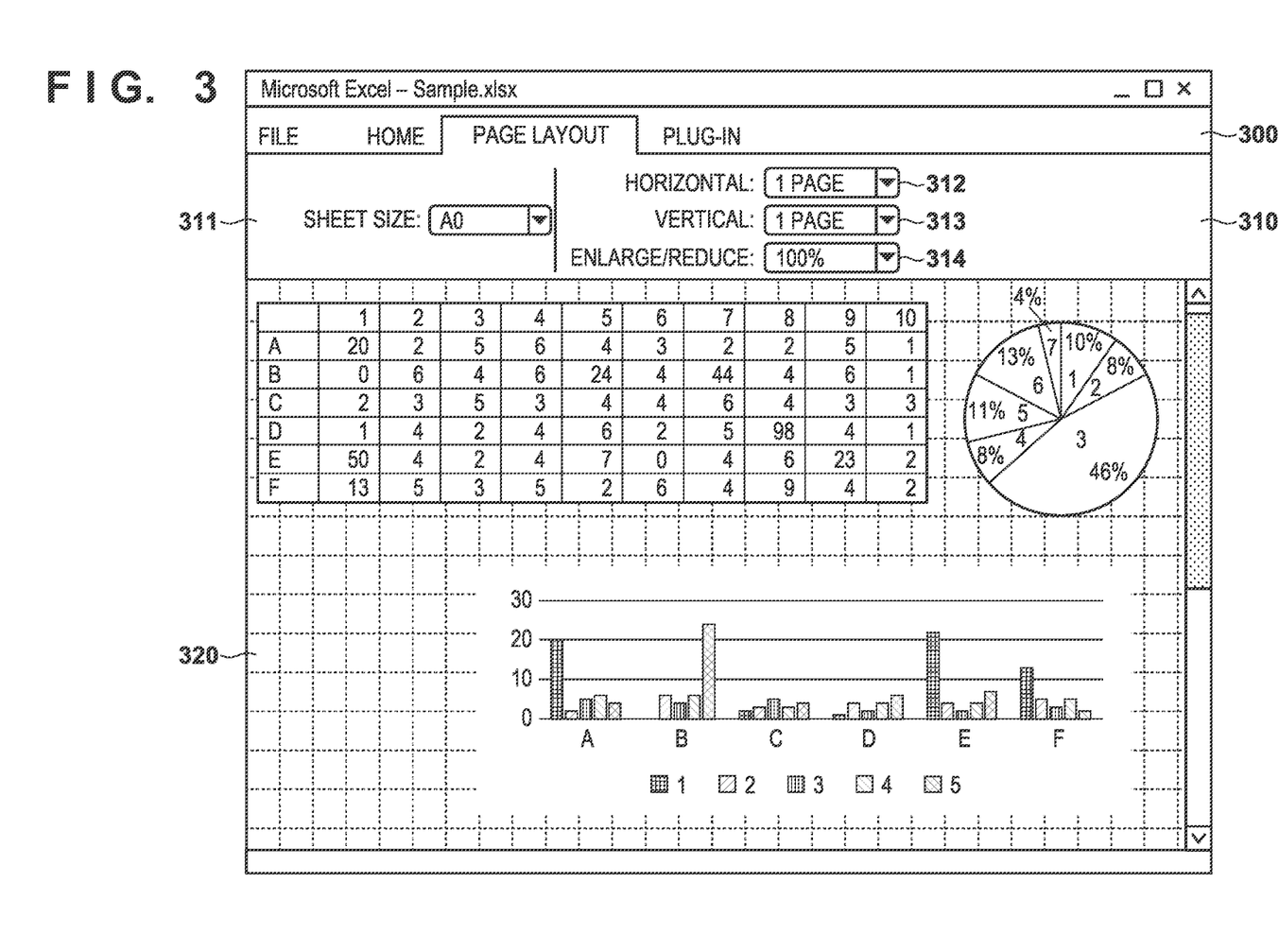
FIG. 3 is a view showing an example of a screen of spreadsheet software.

FIG. 3 shows a user's worksheet screen when the spreadsheet software 100 is executed on the host apparatus 1. The screen of the spreadsheet software 100 is formed by a menu bar 300 which displays, in a menu format, the functions included in the spreadsheet software 100, a ribbon 310 which displays functions in the menu by controls such as icons or the like, and a document display region 320 which displays a spreadsheet document that is being currently edited.

When the user selects a menu tab related to the page layout in the menu bar 300, controls 311 to 314 are displayed on the ribbon 310. The control 311 is a control for setting the sheet size to be used for printing. Each of the controls 312 and 313 is a control for designating the sheet count of the print sheets to be used for printing. In addition, the control 312 is a control for setting the page count (the print sheet count) in the horizontal direction, and the control 313 is a control for setting the page count (the print sheet count) in the vertical direction. The control 314 is a control for designating the scale when the spreadsheet is to be scaled and printed. Letting N and M be the horizontal-direction page count and the vertical-direction page count, respectively, the sheet count of print sheets to be actually printed is N×M.

Note that the controls 312 and 313 for designating the sheet count of the print sheets and the control 314 for designating the scale have a mutually exclusive relationship, and only one of these controls can be designated. For example, a case in which A4 is designated as the sheet size 311, "one page" (one print sheet) is designated as the horizontal-direction page count 312, and "one page" (one print sheet) is designated as the vertical-direction page count 313 shows that printing will be performed on one sheet of A4 paper. At this time, the user will not be able to set the scale designation 314. If the drawing data is equal to or smaller than the A4 size, 100% will be set as the scale designation, and if the drawing data is larger than the A4 size, a value smaller than 100% will be automatically calculated as the scale designation 314 and reduced-size printing will be performed. On the other hand, if A4 and 100% are set as the sheet size 311 and the scale designation 314, respectively, printing will be performed on an A4 sheet at a size of 100%. At this time, if the drawing data is larger than the A4 size, a page count larger than "one page" will be set as the horizontal-direction print sheet count 312 and the vertical-direction print sheet count 313, and for example, a total of six sheets, obtained by multiplying two sheets in the horizontal direction and three sheets in the vertical direction, will be printed.

Figure 4:
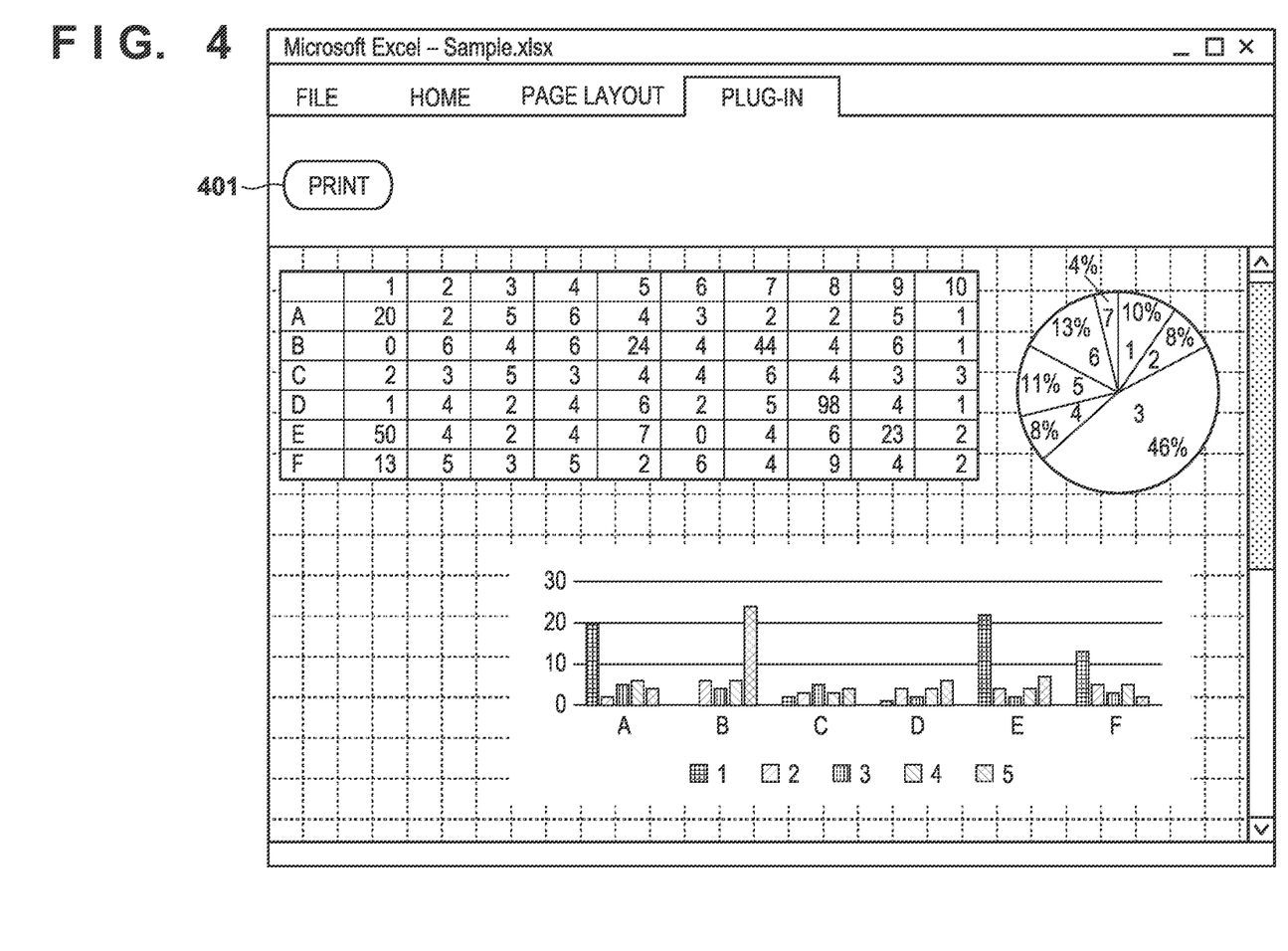
FIG. 4 is a view showing an example of a screen in which a plug-in has been plugged into the spreadsheet software.

FIG. 4 illustrates a screen shown when the user has selected a menu tab "plug-in" related to the plug-in 101 in the menu bar 300. Assume that the plug-in 101 has been registered in the spreadsheet software 100 in advance. Note that since a general plug-in system registration method to be used for spreadsheet software is well known, a description will be omitted.

Reference numeral 401 denotes a control included in the plug-in 101 according to this embodiment, and is a print button to print the currently open spreadsheet document on a single sheet without wasteful margins. The user moves a curser, which is in-sync with the input unit 206, above the button indicated by this control 401 and performs a clicking operation (to be simply referred to as pressing operation hereinafter), the CPU 201 will execute processing defined by the plug-in 101 as a part of the function of the spreadsheet software 100. The processing procedure of this plug-in 101 to be executed by the CPU 201 will be described hereinafter with reference to FIG. 5.

Figure 5:
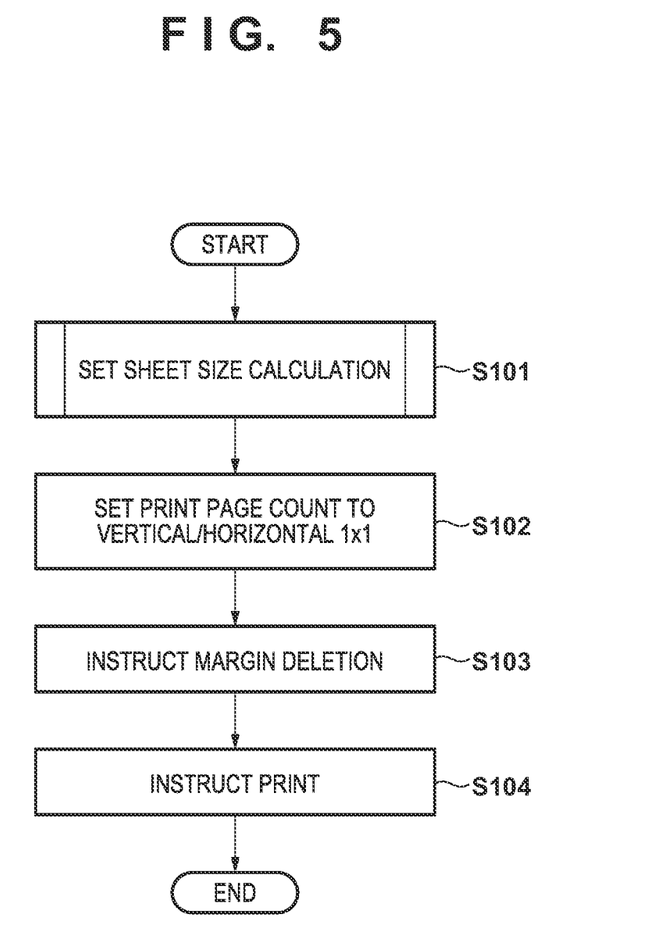

First, in step S101, the CPU 201 calculates and sets the sheet size to be used for printing. This calculation and setting processing will be described with reference to the flowchart of FIG. 6. Note that the following description is a part of the processing of the plug-in 101, as a matter of course.

Figure 6:
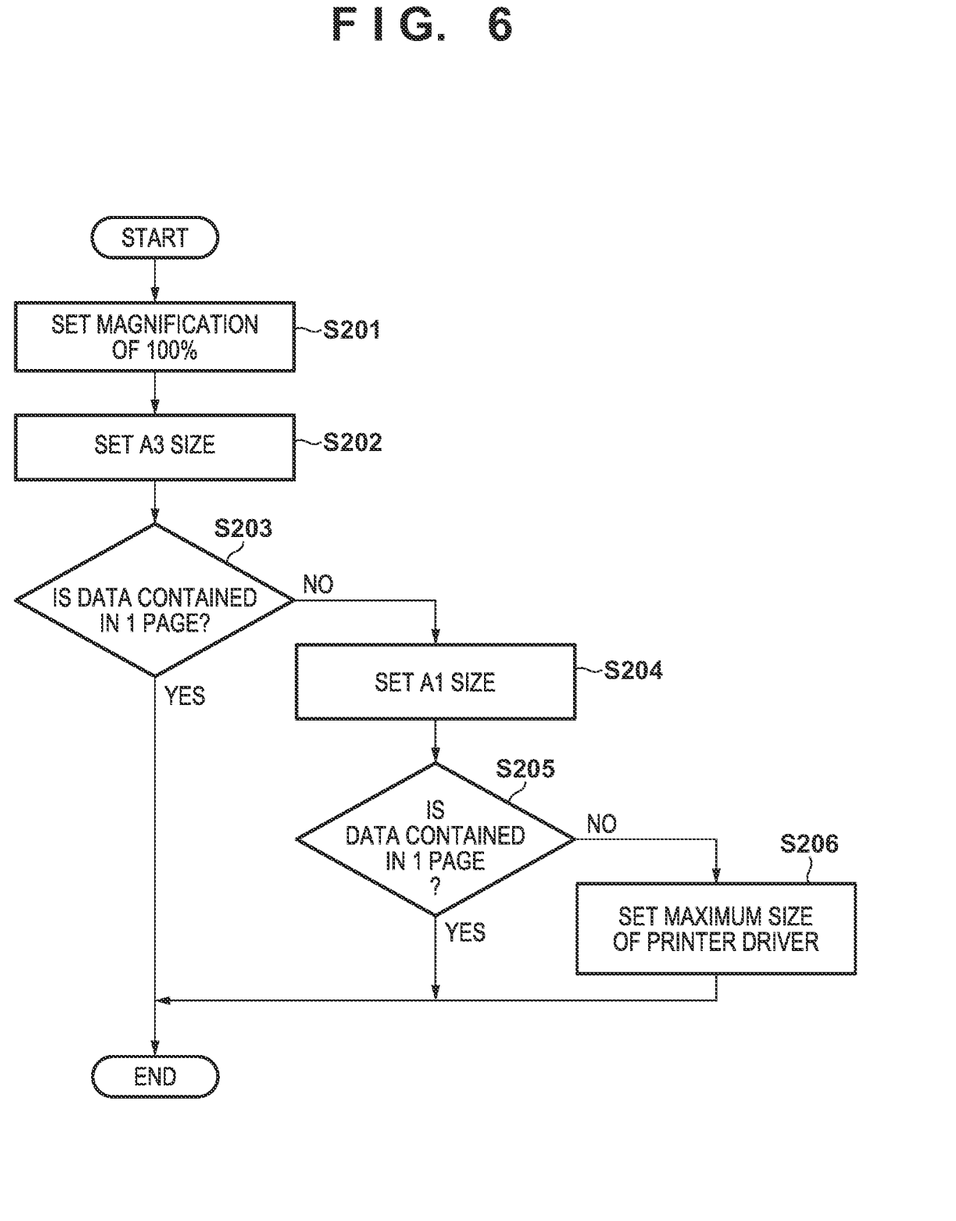

In step S201, the CPU 201 sets a value of 100%, as the initial value, to the scale designation 314 by using an API of the spreadsheet software 100. Since the API of the spreadsheet software 100 is well known, a description thereof will be omitted (this also applies to the following description).

Next, in step S202, the CPU 201 uses the API of the spreadsheet software 100 to set a predetermined size set in advance in the control 311, and advances the process to step S203. Although this predetermined size will be handled as a fixed value in this embodiment, it may be arranged so that the size can be set by the user. In such a case, assume that the information related to the set size will be stored in the external storage device 205 and will be maintained unless the user particularly makes a change instruction.

The predetermined size mentioned here is the size of the print data to be generated by the spreadsheet software 100, and is a tentative print sheet size unrelated to the size of the print sheet actually mounted on the printing apparatus 2. Although details will become apparent from the following description, the spreadsheet software 100 will generate print data based on the sheet size set here, and the printer driver 110 or the preview software 140 will subsequently execute deletion of a peripheral margin region and scaling processing (enlargement or reduction) corresponding to the actual print sheet size. It is preferable for a large sheet size that will allow printing to be performed at a magnification of 100% to be set to the spreadsheet software 100 so the drawing data will not be wastefully reduced and the image quality will not be degraded. However, if the sheet size is set to a wastefully large value, it will take more time to execute the subsequent rendering processing and the margin region deletion processing. Thus, it is ideal to set a size a little larger than the drawing data, and A3 size, which is capable of containing data up to A3 size and has a high use frequency in general, is set as the initial value of the predetermined size in step S202.

In step S203, the CPU 201 determines the number of pages to be printed and whether this result can be contained within one print sheet (that is, one page) if the drawing data of the spreadsheet document is to be printed in accordance with the sheet size and the scale factor of 100% that have been set. If it is determined that the result cannot be contained within one print sheet (one page), the CPU 201 advances the process to step S204. If it is determined that the result can be contained within one page, the CPU 201 will end this processing. Note that although the method of determining whether the result can be contained within one page is not particularly limited, for example, a method of obtaining the current sheet count through the of the spreadsheet software 100 or a method of determining the number of page breaks can be considered.

In step S204, the CPU 201 sets a size larger than the previously set "A3" size, and the process advances to step S205. Assume here that "A1" size has been set.

In step S205, the CPU 201 performs the same process as that performed in step S203. The only difference is that the sheet size set at this stage has been changed to "A1". If it is determined that the print target spreadsheet document cannot be contained within one print sheet (one page), the CPU 201 advances the process to step S206. If it is determined that the print target spreadsheet document can be contained within one sheet, the CPU ends the processing.

In step S206, the CPU 201 sets the maximum sheet size that can be used by the printer driver 110 and ends the sheet size calculation processing. In this case, it is possible to consider, as the maximum sheet size, a method of designating a standard size such as A0 that is in compliance with an industry standard or a method of pre-registering, at the time of the installation of the spreadsheet software 100, an original maximum size that can be used for printing and designating this original maximum size. In the case of the original size registration, a method of registering the size in a sheet size database of an OS standard can be employed, and in this case, for example, a size of 60 in ×5 m can be registered and used. The original size registered here differs from the custom size to be used temporarily, and high quality printing can be performed without having to reduce large data that exceeds 3.2 m since the size is not restricted to 3.2 m or the like.

According to the sheet size calculation processing described above, the sheet size is set in three stages in accordance with the size of the drawing data. As a result, it is possible to reduce cases in which printing is performed by using a wastefully large size, increase the speed of the margin deletion processing (to be described later) and the speed of printing itself, and suppress image quality degradation. Note that although three sheet sizes are used in this embodiment, the number and the sizes of the sheets to be used can be changed. In addition, it is possible to consider a method of setting the maximum size as the fixed size or fixing the size to a specific size such as A1 in the printer driver 110.

The description will return to the processing of the flowchart shown in FIG. 5.

In step S101, after the CPU 201 ends the print-sheet size setting processing, the process advances to step S102.

In step S102, the CPU 201 uses the API of the spreadsheet software 100 to set "one page" to the horizontal-direction print sheet count 312 and "one page" to the vertical-direction print sheet count 313 in the page setting of the spreadsheet software 100, and the process advances to step S103. This processing prevents the spreadsheet software 100 from dividing a generated table at unintended locations, and ensures the implementation of single-sheet printing. The scale factor set in step S201 is automatically calculated again by this processing, and a value smaller than 100% will be set as the scale factor if the sheet size is smaller than the drawing data. Note that in a case in which the sheet size is equal to or larger than the drawing data, the value of 100% will be maintained.

As a result of the process of step S102, the data in which the spreadsheet document is contained within one page will be output as a print target from the spreadsheet software 100 at the execution of printing. However, since processing to change the sheet size set by the process in step S202, S204, or S206 described above to a size that is a better fit for the spreadsheet document has not been performed, wasteful margins may be generated in the print target data.

Hence, in step S103, the CPU 201 makes an instruction to the printer driver 110 to delete the margins at the top, bottom, left, and right of the print data to be printed, and the process advances to step S104. As the instruction method, it is possible to consider, for example, an instruction method using an SDK (Software Development Kit) of the printer driver 110, a method of making an instruction through the name of the document to be printed, or the like. Basically, any method is sufficient as long as the printer driver 110 can be notified of the margin deletion.

In step S104, the CPU 201 uses the API of the spreadsheet software 100 to cause the spreadsheet software 100 to execute printing under the current settings, and the processing ends. Note that in step S104, a print target spreadsheet document included in the one page of the sheet size set in step S101 is output to the printer driver set as the output destination under the current settings. The printer driver 110 is set as the output destination printer driver in this case.

Figure 7:
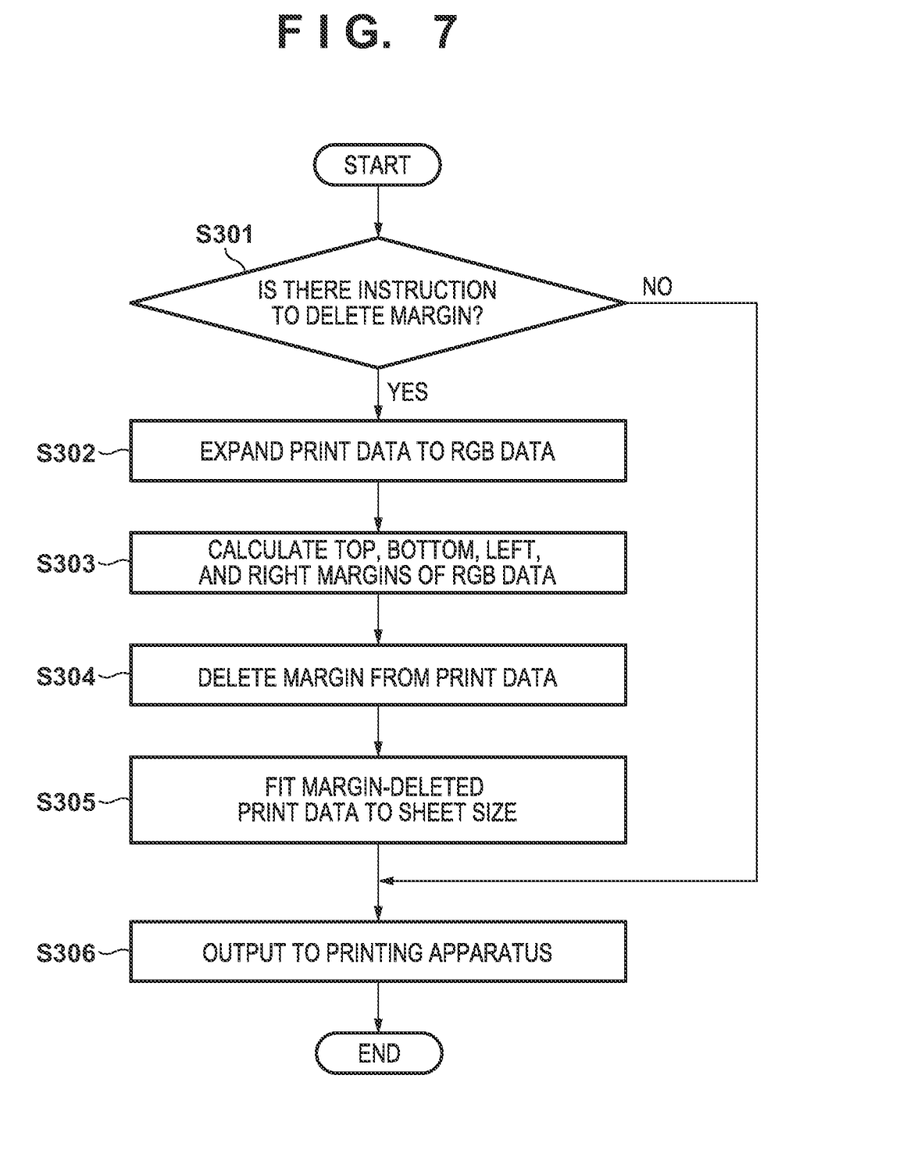
FIG. 7 is a flowchart of a printer driver.

The procedure in which the CPU 201 executes the printer driver 110 after printing has been executed by the spreadsheet software 100 will be described next with reference to the flowchart of FIG. 7. This processing is executed in response to the process of step S104 described above.

First, in step S301, the CPU 201 confirms whether there is a margin deletion instruction designated in step S103. If there is an instruction, the process advances to step S302. Otherwise, the process advances to step S306. By this process, the printer driver 110 will not need to constantly delete the margins and will be able to divide printing cases between a printing case not requiring margin deletion and a printing case requiring margin deletion.

In step S302, the CPU 201 will generate print image data by rendering the print target data transferred from the spreadsheet software 100 into RGB data. Then the CPU 201 advances the process to step S303. Note that although rendering in an RGB color space has been described here, the type of the color space is not limited to this. It may be, for example, a color space such as CMYK, RGBA, or the like.

In step S303, the CPU 201 calculates the top, bottom, left, and right margins of the print image data obtained by rendering, and the process advances to step S304. As the calculation method, scanning is performed from the topmost line toward lower lines of the print image data, and a region up to the first line that includes a pixel (a non-white pixel) which is not completely white will be determined as a margin region. By performing this processing similarly in the left, right, and bottom directions, the top, bottom, left, and right margins of the print image data are calculated. That is, a bounding rectangle of a region including a non-white pixel is obtained in the rendered print image data, and the region outside the bounding rectangle is determined to be the deletion region. Note that the margin calculation method according to this embodiment is not limited to the calculation method described above. For example, coordinate update processing can be executed when coordinates used to render a non-white pixel exceed the maximum coordinates in the respective vertical and horizontal directions or are below the minimum coordinates during the rendering processing, and each margin may be calculated from these coordinates when the rendering has been completed.

In step S304, the CPU 201 deletes the margins based on the margin regions calculated in step S303, and the process advances to step S305. If the RGB data is to be transmitted intact to the printing apparatus 2, margin locations (outside the bounding rectangle) can be deleted as the margin deletion target from the RGB data. In addition, if data of a format (XPS, PDF, or the like) other than RGB needs to be transmitted to the printing apparatus 2, margin location deletion will be performed on this format. The margin deletion target and timing are not particularly limited, and for example, margin deletion can be performed in the printing apparatus 2. Changes not only to the drawing data but also to information such as the sheet size to be transmitted to the printing apparatus 2 are performed as needed.

In step S305, the CPU 201 performs enlargement/reduction processing (scaling processing) to make the margin-deleted print data fit the sheet size set in the printing apparatus 2, and the process advances to step S306. Note that the sheet medium and the sheet size to be used for printing are not particularly limited. For example, in the case of a sheet medium that can be used for longitudinal printing such as a rolled sheet or the like, the enlargement/reduction processing can be performed by changing the width of the print data to fit the width of the rolled sheet. On the other hand, in the case of a cut sheet, a method of preventing wasteful margin generation by making the print data fit inside a standard size such as A4 size or the like or a method of further reducing margin generation by performing fitting processing after rotating the print data by 90° can be considered. As the method of specifying the sheet medium and the sheet size to be used in the printing, there is, for example, a method of pre-arranging a control for designating the sheet medium and the sheet size in the plug-in 101. In addition, it is also possible to consider a method in which the printing apparatus 2 detects the sheet size of the currently mounted sheet medium and the CPU 201 subsequently obtains the detected sheet size by executing communication between the host apparatus 1 and the printing apparatus 2. In step S306, enlargement/reduction processing is performed so that the print data will fit the sheet size designated by the user or the sheet size obtained from the printing apparatus 2 in this manner. Particularly, in the case of the cut sheet, note that the aspect ratio of the cut sheet and the aspect ratio of the rectangular range to be printed by the spreadsheet software 100 may not match. In such a case, printing will be performed by matching the longitudinal direction of the rectangular range to be printed to the longitudinal direction of the cut sheet.

In step S306, after converting the print image data that has undergone margin deletion and the above-described enlargement/reduction processing into print data of a format analyzable by the printing apparatus 2, the CPU 201 transfers the print data to the printing apparatus 2 and ends the processing.

Figure 8:
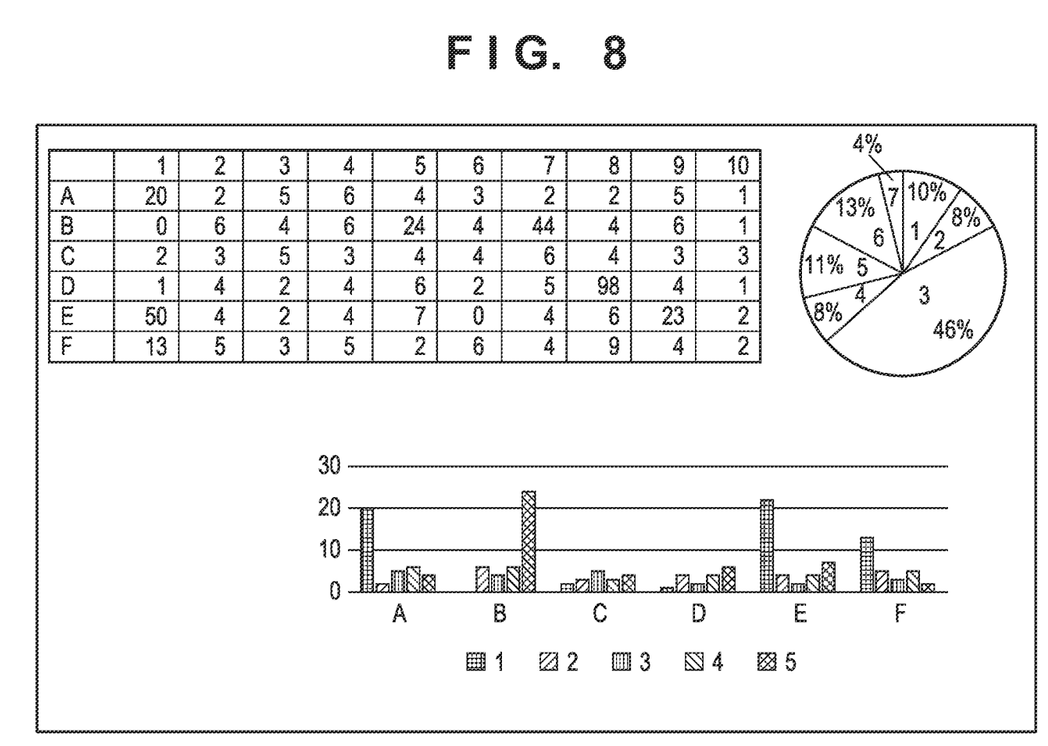
FIG. 8 is a view showing an example of a printing result in which a margin has been deleted.

As described above, according to this embodiment, by the collaborative processing of two control programs of the above plug-in 101 and the printer driver 110, it is possible to print the printing range which includes a table (document) generated by the spreadsheet software 100 in a custom size on one print sheet without the margins or with reduced margins as shown in FIG. 8. Particularly, according to the embodiment, a sheet size that can include the spreadsheet document in one page is set to the spreadsheet software 100 by the processing shown in FIG. 6. The spreadsheet software 100 generates print target data of a size corresponding to this sheet size. Subsequently, the printer driver 110 will execute margin deletion. Thus, for example, compared to a case in which a sheet size with fewer margins is calculated and set to the spreadsheet software 100 after the processing shown in FIG. 6, it is possible to set the sheet size to the spreadsheet software 100 by performing simpler processing. Also, although the spreadsheet software 100 may generate data with margins, the printer driver 110 will delete the margins. Therefore, although the settings performed on the spreadsheet software 100 will be simpler, a printing result in which the margins have been appropriately deleted or reduced can be obtained.

There may also be a case in which the spreadsheet software 100 cannot delete a margin in a cell of a spreadsheet document. In this case, for example, even if a sheet size more suitably fitting the spreadsheet document is set, the print target data will be generated in a state in which the margin in the cell remains. However, according to this embodiment, the printer driver 110 will delete a margin not as data of the spreadsheet document but as image data such as RGB data or the like. Hence, a margin originally arranged in a cell in the spreadsheet document can be removed from the print target of the printing apparatus 2.

Note that in step S306, the printer driver 110 may add, separately from the margin deleted in step S304, a predetermined margin for printing on the print image data. Alternatively, printing may be performed in the printing apparatus 2 so that a predetermined margin for printing will be added. This will allow a certain amount of margin to remain in the printing result even if the margins have been completely deleted in step S304 and the actual data of the spreadsheet document has been arranged at the edge of the print image data. This can ensure the visibility of the printing result. Alternatively, margin reduction may be performed so as to leave a predetermined amount of margin to ensure the visibility of the printing result in step S304.

Note that although Microsoft Excel® has been exemplified as the spreadsheet application to which the plug-in 101 is applied in the embodiment described above, the present invention need not be limited to Microsoft Excel® since it is sufficient as long as an application that allows the use of a plug-in is used.

Second Embodiment

Next, an example for performing preview display and layout change on data that has undergone margin deletion before printing will be described in the second embodiment.

Figure 9:
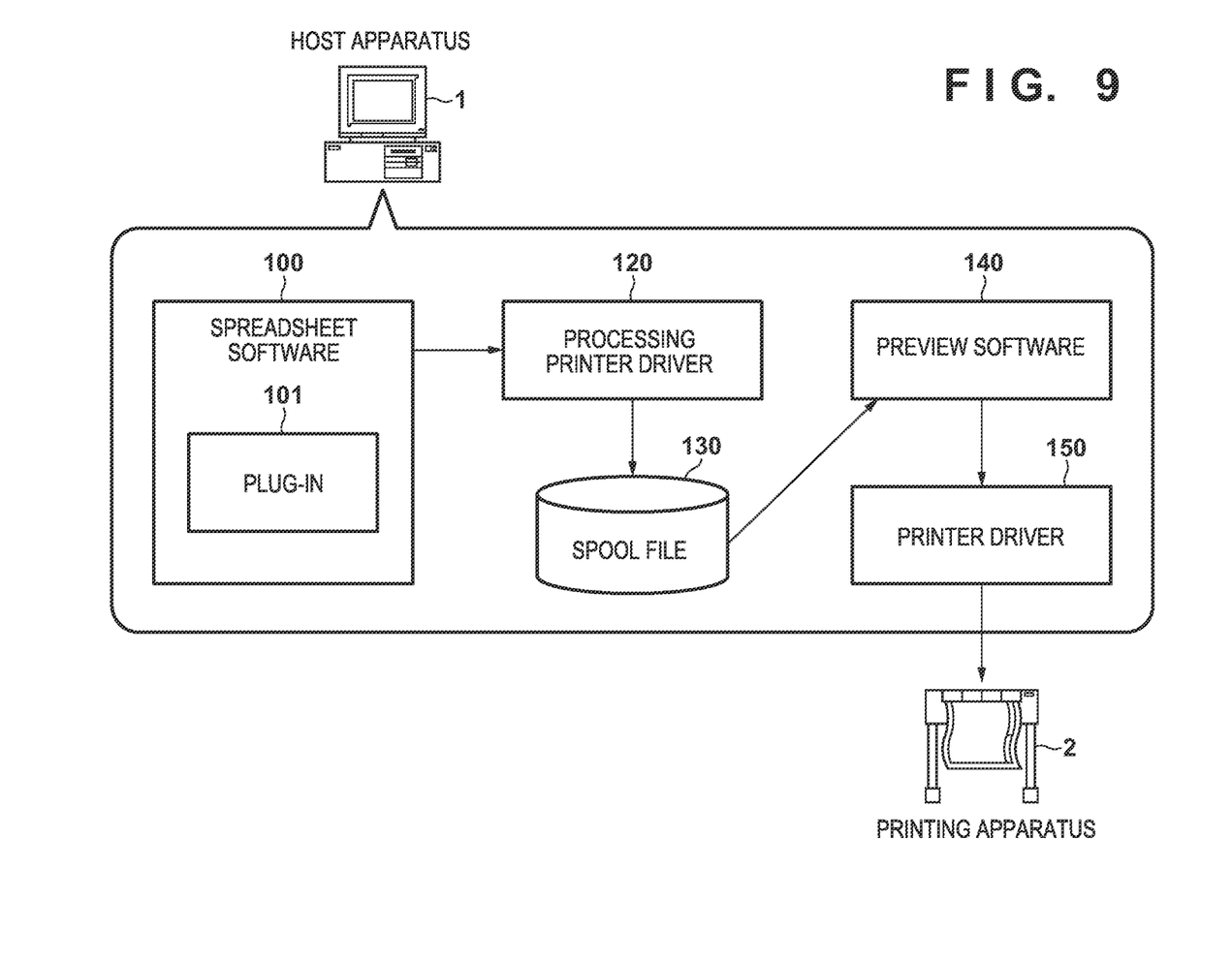
FIG. 9 is a view of the arrangement of a system according to the second embodiment.

FIG. 9 is a view of the arrangement of a system according to the second embodiment. Since a host apparatus 1, a printing apparatus 2, spreadsheet software 100, and a plug-in 101 of this system are the same as those of FIG. 1, a description thereof will be omitted.

A processing printer driver 120 is a printer driver that receives print data from the spreadsheet software 100 and performs processing until margin deletion. However, the processing printer driver 120 outputs the margin-deleted image data as a spool file 130 without performing printing in the printing apparatus 2. The output location of the spool file 130 is not particularly limited and suffices to be a location, such as the Temp folder or AppData predefined in an external storage device 205, which can be read out by preview software 140 (to be described later).

The preview software 140 reads out the spool file 130 and displays the margin-deleted data on a display unit 207 as a preview window. As the activation method of the preview software 140, it is possible to consider a method in which the user himself/herself activates the software, a method of preparing a resident application that monitors print processing of the processing printer driver 120 and activates the preview software 140 at the printing timing, or the like. A method of automatic activation by monitoring the spool file 130, a method of direct activation by the processing printer driver 120, or the like may also be employed.

A printer driver 150 is a general printer driver for transferring print data to the printing apparatus 2. Transmission processing to the printing apparatus 2 is executed when a print instruction is made from the preview software 140 to the printer driver 150. Note that by setting an arrangement that internally switches the processing operations in the processing printer driver 120 and the printer driver 150, it is possible to have an arrangement in which the processing operations are integrated into a single printer driver.

Figure 10:
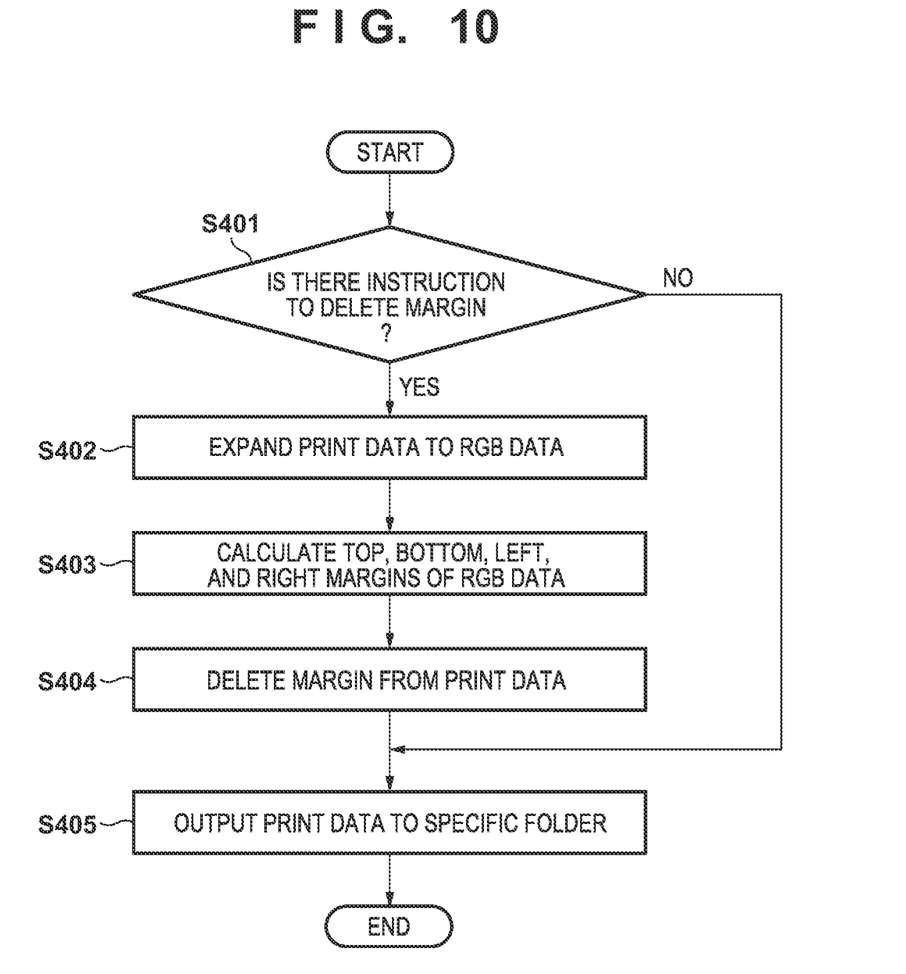
FIG. 10 is a flowchart showing a processing procedure performed by a printer driver for processing.

FIG. 10 is a flowchart illustrating the operation of the processing printer driver 120 after printing has been executed from the spreadsheet software 100. FIG. 10 is a flowchart that can replace FIG. 7 of the first embodiment which has been described previously. Since the same processes as steps S301, S302, S303, and S304 are performed in steps S401, S402, S403, and S404, respectively, a description will be omitted. The process of step S405 will be described here.

In step S405, a CPU 201 outputs the margin-deleted print data as the spool file 130 and ends the processing. In this case, if it is possible to make changes to enlarge or reduce the print data in the preview software 140, it is preferable to delete the margins in step S404 and to change the print data to be output to a specific folder in step S405 into a vector-format data. For example, in a case in which the processing printer driver 120 is an XPS (XML Paper Specification) driver that handles print data as an XPS, the print data that is received by the printer driver 150 will be a vector-format XPS data. In this case, although the calculation of the margin locations in step S403 will be performed on data obtained by converting the XPS data into RGB data, the print data to undergo margin deletion in step S404 and to be output in step S405 will be the vector-format XPS data. As a result, since processing will be performed on the vector-format XPS data even in a case in which the print data is to be enlarged or reduced on the preview software 140, quality degradation such as an interruption of a thin line or coarsening of characters will not occur, and high-quality printing can be implemented.

Figure 11:
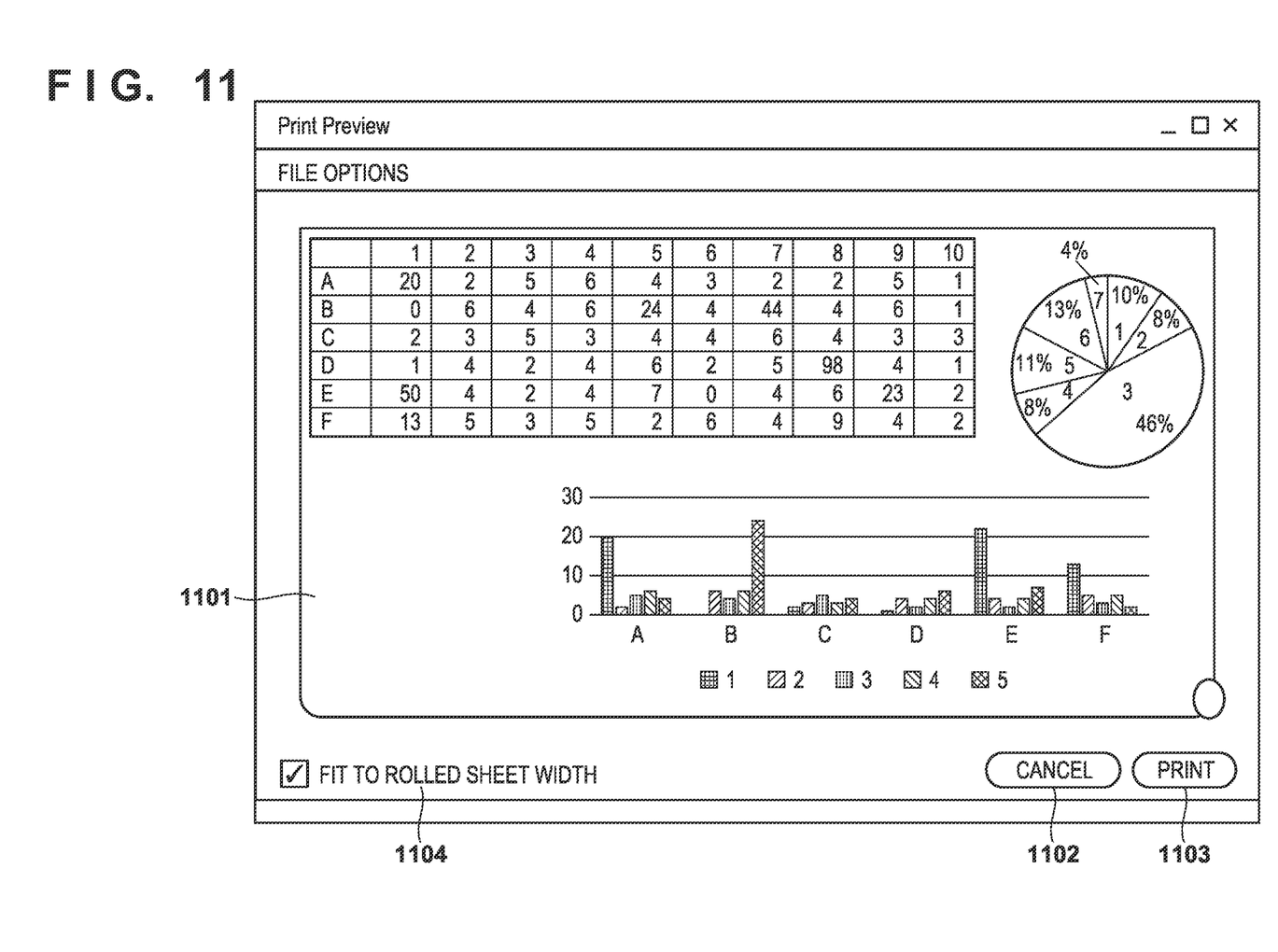
FIG. 11 is a view showing an example of a screen of preview software.

FIG. 11 shows an example of a preview window displayed by the preview software 140. Reference numeral 1101 in FIG. 11 denotes a screen showing an image of worksheet for confirming a printing result. The user can press (click) a cancel button 1102 if he/she wants to cancel the printing or press a print button 1103 to execute the printing if he/she wants to execute the printing.

The preview software 140 can not only have a print data preview function but also a print data processing function. For example, in a case in which the length of the width of the margin-deleted print data and the length of the rolled sheet width do not match, the user can check a checkbox 1104 for automatically adjusting the print data so that the print data will fit the rolled sheet width. As a result, printing without the generation of wasteful margins can be reliably implemented.

In addition, although the processing printer driver 120 performed margin deletion in the second embodiment, the margin deletion may be performed by the preview software. Note that the printer driver 150 according to the second embodiment performs the process of step S305 in FIG. 7 and transmits the print data to the printing apparatus 2.

As described above, according to the second embodiment, it is possible to implement previewing of margin-deleted print data and additional processing on the margin-deleted print data.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-099792, filed May 24, 2018, which is hereby incorporated by reference herein in its entirety.

What is claimed is:

1. An information processing apparatus, comprising:
   at least one memory which stores a first control program which is plugged in to an application that generates first data as a print target, a first printer driver which is to be executed based on an instruction made via the first control program, and a second control program; and
   at least one processor executing instructions stored in the at least one memory, the instructions being executed to:
   set, by the first control program, a predetermined sheet size which can include the first data in one page,
   set, by the first control program, a margin deletion setting to the first printer driver to cause margin deletion,
   cause, by the first control program, the application to output the first data as the print target which is included in the one page having the predetermined sheet size, to the first printer driver,
   generate, by the first printer driver, second data based on the first data output as the print target, by executing the margin deletion for deleting a margin from the first data,
   display, by the second control program, an image which is based on the second data generated by the first printer driver, on a display screen, and
   causes, by the second control program, a second printer driver to output print data which is based on the second data to a printing apparatus.

2. The apparatus according to claim 1, wherein the at least one processor executes the instructions to set, out of print sheets of a plurality of sizes that have been preset, a minimum size print sheet that can include a printing range of the output data.

3. The apparatus according to claim 2, wherein the at least one processor, by using the first control program,
   determines a first sheet size as the predetermined sheet size if the first sheet size can includes the output data, and
   determines, as the predetermines sheet size, a second sheet size larger than the first sheet size if the first sheet size cannot include the output data.

4. The apparatus according to claim 1, wherein the at least one processor executes instructions to generate a print image of the first data and included in the one page having the predetermined sheet size, and deletes a margin in the generated print image, by the first printer driver, and
   wherein the second data is based on the generated print image after the margin deletion.

5. The apparatus according to claim 4, wherein the at least one processor executes instructions to perform margin deletion by obtaining a bounding rectangle of a region including a non-white pixel in the print image and determining an outside of the bounding rectangle as the margin.

6. The apparatus according to claim 4, wherein the at least one processor executes instructions to execute, by the second control program, a process for scaling the print data in accordance with a size of a print sheet set in the printing apparatus.

7. The apparatus according to claim 4, wherein the at least one processor generates the print image by the first printer driver based on output vector data, and deletes a margin in the generated print image by the first printer driver, and outputs vector data, as the second data, based on the print image of which the margin is deleted, by the first printer driver,
   the at least one processor, by the second control program, displays the image, based on the vector data, as the second data, output by the first printer driver.

8. The apparatus according to claim 1,
   wherein the at least one processor executes instructions to execute an output to the second printer driver when a user inputs a printing instruction in the display of the image by the second control program.

9. The apparatus according to claim 1, wherein the first control program is a plug-in of spreadsheet software.

10. The apparatus according to claim 1, wherein the at least one processor stores the second data generated by the first printer driver, to a predetermined location, and
    the at least one processor reads out, by the second control program, the second data from the predetermined location, and displays the image based on the read out second data, on the display screen.

11. The apparatus according to claim 1, wherein the at least one processor, by using the first printer driver, generates data based on the output first data as the print target, and executes the margin deletion on the generated data, and
    wherein the second data is based on the generated data after the margin detention.

12. A control method of an information processing apparatus that generates first data as a print target by using an application and executes a first control program which is plugged in to the application, a first printer driver which is to be executed based on an instruction made via the first control program, and a second control program, the method comprising:
    setting, by the first control program, a predetermined sheet size which can include the first data in one page,
    setting, by the first control program, a margin deletion setting to the first printer driver to cause margin deletion;
    causing, by the first control program, the application to output the first data as the print target which is included in the one page having the predetermined sheet size, to the first printer driver;
    generating, by the first printer driver, second data based on the first data output as the print target by executing the margin deletion for deleting a margin from the data;
    displaying, by the second control program, an image which is based the second data generated by the first printer driver, on a display screen; and
    causing, by the second control program, a second printer driver to output print data which is based on the second data to a printing apparatus.

13. The method according to claim 12, wherein in the setting, a minimum sized print sheet that can include a printing range of the output data is set out of print sheets of a plurality of sizes that have been preset.

14. The method according to claim 13, wherein in the first control program, a first sheet size is determined as the predetermined sheet size if the first sheet size can include the output data, and a second sheet size larger than the first sheet size is determined as the predetermined sheet size if the first sheet size cannot include the output data.

15. The method according to claim 12, wherein in the margin deletion by the first printer driver, a print image of the first data by the application and included in the one page having the predetermined sheet size is generated, and a margin in the generated print image is deleted, and wherein the second data is based on the generated print image after the margin deletion.

16. The method according to claim 15, wherein the margin deletion is performed by obtaining a bounding rectangle of a region including a non-white pixel in the print image and determining an outside of the bounding rectangle as the margin.

17. The method according to claim 15, wherein a process for scaling the print data in accordance with a size of a print sheet set in the printing apparatus is executed by the second control program.

18. The method according to claim 15, wherein, in the first printer driver, the print image is generated based on output vector data, a margin in the generated print image is deleted, and vector data based on the print image of which the margin is deleted is output as the second data, and wherein, in the second control program, the image which is based on the vector data, as the second data output by the first printer driver is displayed.

19. The method according to claim 12, wherein in the outputting in the second control program, an output to the second printer driver is executed when a user inputs a printing instruction in the display of the image by the second control program.

20. The method according to claim 12, wherein the first control program is a plug-in of spreadsheet software.

21. The method according to claim 12, wherein the second data generated by the first printer driver is stored to a predetermined location, and wherein, by the second control program, the second data is read out from the predetermined location, and the image is displayed based on the read out second data, on the display screen.

22. The method according to claim 12, wherein, in the first printer driver, data is generated based on the output first data as the print target, and the margin deletion is executed on the generated data, and wherein the second data is based on the generated data after the margin deletion.

23. A non-transitory computer-readable storage medium storing a first control program which is plugged in to an application that generates first data as a print target, a first printer driver which is to be executed based on an instruction made via the first control program, and a second control program, the first control program, the first printer driver, and the second control program causing a computer to perform;

setting, by the first control program, a predetermined sheet size which can include the first data in one page, setting, by the first control program, a margin deletion setting to the first printer driver to cause margin deletion;

causing, by the first control program, the application to output the first data as the print target which is included in the one page having the predetermined sheet size, to the first printer driver;

generating, by the first printer driver, second data based on the first data output as the print target, by executing the margin deletion for deleting a margin from the data;

displaying, by the second control program, an image which is based on the second data generated by the first printer driver, on a display screen; and causing, by the second control program, a second printer driver to output print data which is based on the second data to a printing apparatus.

* * * * *